United States Patent [19]
Renshaw

[11] 3,790,107
[45] Feb. 5, 1974

[54] BOUNDARY LAYER AIR CONTROL MECHANISM FOR AIRCRAFT

[75] Inventor: John H. Renshaw, Marietta, Ga.

[73] Assignee: Lockheed Aircraft Corporation, Burbank, Calif.

[22] Filed: Mar. 16, 1973

[21] Appl. No.: 342,253

[52] U.S. Cl.......................... 244/42 CC, 244/42 DA
[51] Int. Cl............................................. B64c 21/08
[58] Field of Search..244/42 CC, 42 C, 42 D, 42 DA, 244/40 R, 41, 130

[56] References Cited
UNITED STATES PATENTS
2,920,844  1/1960  Marshall et al................ 244/42 CC
3,009,668  11/1961  Nystrom........................ 244/42 CC Primary Examiner—Duane A. Reger
Assistant Examiner—Barry L. Kelmachter
Attorney, Agent, or Firm—John J. Sullivan; Billy G. Corber

[57] ABSTRACT

Pressurized air is provided from an onboard aircraft source to a duct within an external control surface where it is selectively metered through a control valve to nozzles located on each side of the control surface. Movement of the control surface in one direction concurrently moves the control valve to pass the air exclusively to the nozzles on one side of the surface while movement of the control surface in the opposite direction concurrently moves the control valve to pass the air exclusively to the nozzles on the other side of the surface. Thus boundary layer air control is provided to the desired side of the control surface automatically from a single duct.

5 Claims, 4 Drawing Figures

PATENTED FEB 5 1974

BOUNDARY LAYER AIR CONTROL MECHANISM FOR AIRCRAFT

This invention relates to boundary layer air control mechanisms as employed on aircraft to maintain airflow over the external surfaces thereof for the more efficient, aerodynamic functioning of the aircraft and more particularly to such a mechanism especially designed and constructed for use in conjunction with movable lift and/or control surfaces of aircraft whereby boundary layer air is selectively maintained on either side thereof.

While the present invention has general utility in boundary layer air control applications, it is particularly suited for aircraft having short take-off and landing (STOL) capabilities. In STOL aircraft comparatively large angular deflections of the external control surface member are required in order to produce lift and drag effects of the desired magnitude on the aircraft. Thus, boundary layer control has been generally accepted as necessary to assure the attachment of the airflow over the entire external surface of the control member when totally deflected. To this end, air jets or nozzles have been employed adjacent the hinge line of the control member to blow air obtained from a suitable onboard source in a generally parallel direction with respect to the external surface thereof. Since the most practical and convenient onboard source of air is the fan air of the engine, i.e., low pressure/low temperature air, relatively large diameter ducts are required to deliver the quantities of air needed to the nozzles. These ducts and related apparatus detract appreciably from the internal areas of the aircraft which might otherwise be available for fuel, cargo, and the like. This situation becomes aggravated where a requirement exists for boundary layer air control on both sides of the movable control surface.

In many cases, as for example in high performance aircraft where relatively thin wings are employed, the necessary ducting and/or multiple air ducts are either impossible or highly undesirable. Also, in these installations the valving to selectively discharge air over one or the other side of the control surface becomes complex and unreliable. At the same time, the drive mechanism for actuation of the control surface member must not be adversely affected or unduly burdened in its operation by duct and/or linkage obstructions.

The foregoing constitute the principal considerations underlying the present invention. Stated differently, this invention proposes to satisfy the requirements for boundary layer air control over both sides of a movable control surface of a relatively high performance aircraft by the provision of air nozzles adjacent the hinge line of the control surface operatively connected by ducting which accommodates low pressure/low temperature air. The proposed mechanism permits compact ducting and valving so as to require minimum space burden on the aircraft and a location minimizing its interference with the control surface movement and operation. Moreover, the valving and operating mechanism therefore is specifically designed to minimum moving parts resulting in a completely uncomplicated operation and maximum reliability.

More specifically, the boundary layer air control mechanism envisioned herein comprises a single, relatively large diameter duct common to nozzles associated with both sides of the control surface with a control valve to operatively connect a selected nozzle or nozzles on one side of said surface at a time to the duct. The actuator for the control valve is energized by the same agency employed to deflect the control surface so that its movement and direction is automatically coordinated with that of the control surface. The duct nozzles and associated control valve are all located internally of the control surface member and thereby preserve the interior of the associated aircraft component for fuel, cargo, payload use, as well as to remove the boundary layer air control elements from interference with drive actuators for the control surface member.

With the above and other objects in view as will be apparent, this invention consists in the construction, combination and arrangement of parts all as hereinafter more fully described, claimed, and illustrated in the accompanying drawings wherein:

FIG. 1 is a section taken through a portion of a relatively fixed component such as, for example, a wing, stabilizer, etc., of an aircraft and the adjacent, relatively movable member, i.e., an aileron, flap, rudder, elevator, etc., to show a boundary layer air control mechanism designed and constructed in accordance with the teachings of this invention incorporated therein, the movable member being located in the neutral position;

Figure 1:
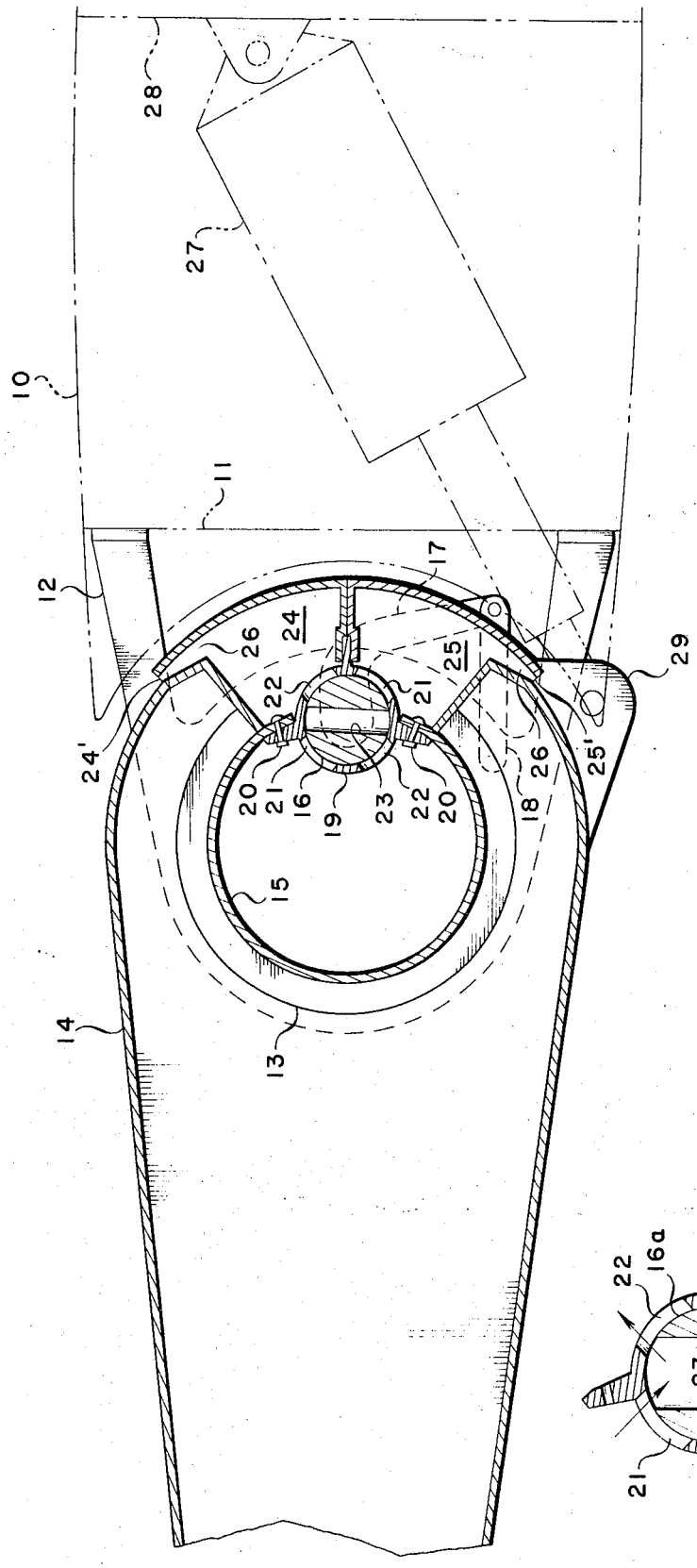

Referring more particularly to the drawings, 10 designates fixed aircraft structure, for example, a fragment of the aft section of a fixed wing. The wing 10 is closed by a rear spar 11 and terminates aftwardly in a series of spaced extension ears 12 each mounting a hinge bearing 13 rotatably mounting an aileron 14 to form, in effect, an integral part thereof. To this end, each hinge bearing 13 is rotatable around a duct 15 secured to and carried internally by the aileron 14. The duct 15 is operatively connected in any conventional manner at one end to a source of air pressure, such as for example the engine fan (not shown) and is interrupted at selected points in its length to accommodate a valve 16. Each valve 16 is connected to the extension ear 12 by means of and through a horn 17 projecting integrally, in effect, from the valve 16 and a link 18 pivotally connected to the ear 12 and the outer end of the horn 17. Each valve 16 is thereby rotated bodily relative to the duct 15 when the aileron 14 is rotated on the hinge bearings 13 in a manner to be described.

Figure 2:
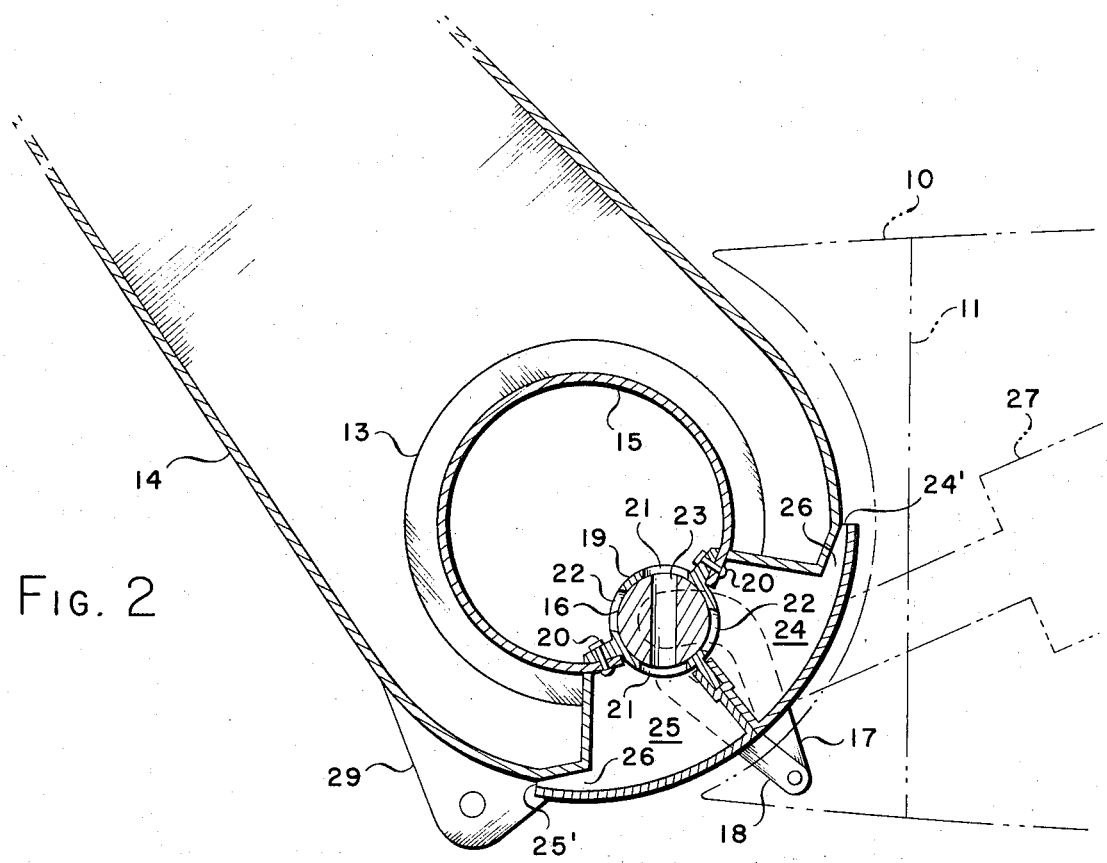
FIG. 2 is a similar view with the movable member being located in one extreme position relative to the neutral position shown in FIG. 1.
Figure 3:
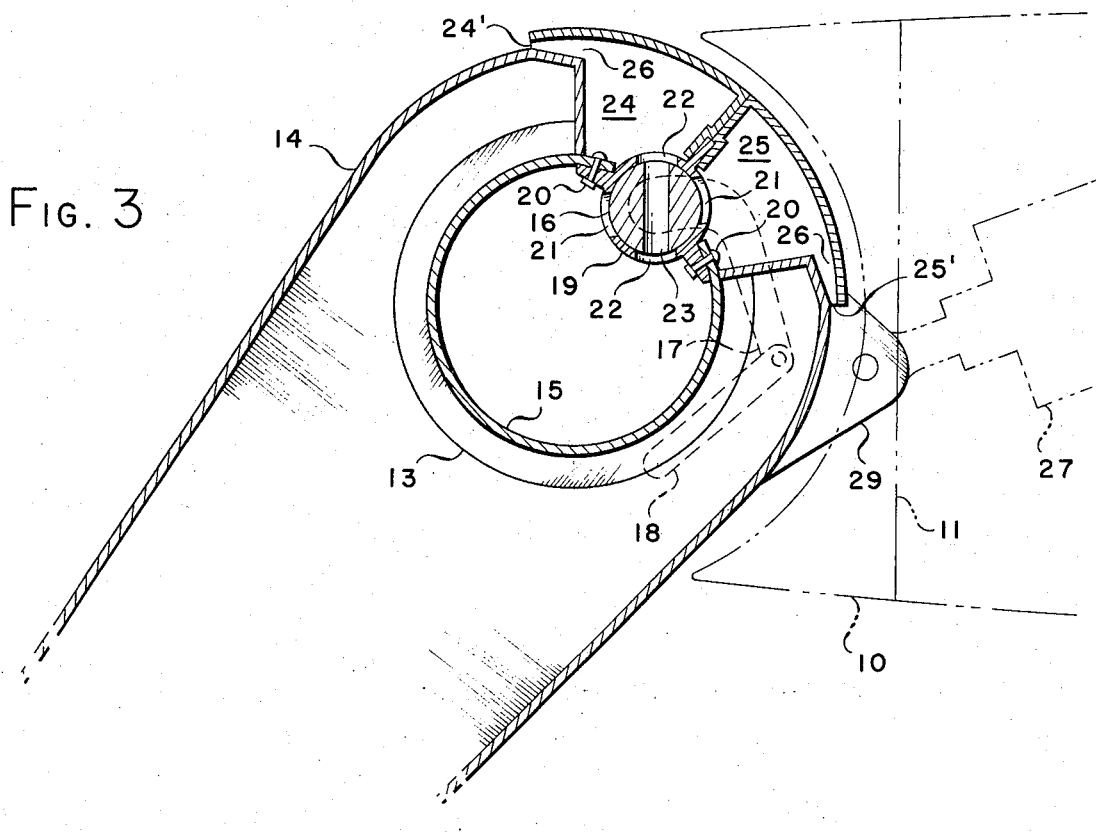
FIG. 3 is a similar view with the movable member being located in the other extreme position relative to the neutral position shown in FIG. 1.

The wall of the duct 15 is interrupted to accommodate each valve housing 19 which is secured as at 20 to the duct wall defining the interruption. The valve housing 19 is pierced by diametrically aligned openings 21 and 22 constituting ports for the escape of air from the duct 15. As shown in the embodiment of FIG. 1, these openings or ports 21 and 22 are normally closed by the valve 16, establishing the neutral position of the aileron 14. The valve 16 is pierced transversely by a passage 23 whereby rotation of the aileron 14 in one direction (FIG. 2) aligns the valve passage 23 with one pair of ports, for example, ports 21, while rotation of the aileron 14 in the other direction (FIG. 3) aligns the valve passage 23 with the other pair of ports 22.

The aileron 14 adjacent the valve housing 19 is formed or otherwise provided with a pair of chambers 24 and 25. These chambers 24 and 25 are isolated one from the other with the chamber 24 communicating with the valve housing port 22 and the chamber 25 communicating with the valve housing port 21. Openings 26 in the wall of each chamber 24 and 25 direct air therefrom outwardly through an associated nozzle 24' and 25' respectively located tangentially of the opposite surface of the aileron 14.

In view of the foregoing structure and arrangement, downward rotation of the aileron 14 produces a counterclockwise rotation of the control valve housing 19 aligning the valve passage 23 with ports 22 permitting air to flow from the duct 15 into the upper chamber 24 of the aileron 14 for exit through the associated nozzle 24'. As the aileron 14 rotates, the nozzle 24' rotates with it reaching the optimum location when required, i.e., at maximum deflection.

Upon rotation of the aileron 14 in the other direction on the other hand the valve housing 19 is rotated in the opposite direction. The valve passage 23 is thereby aligned with ports 21 permitting air to flow from the duct 15 into the lower chamber 25 of the aileron 14 for ejection from the associated nozzle 25' in a similar manner to that described above.

It is, therefore, apparent that the movement of the aileron 14 to and from the extreme positions with respect to neutral automatically causes communication between the internal duct 15 and one or the other of the chambers 24 or 25 for discharge over the adjacent upper or lower surface of the aileron 14. Such movement of the aileron 14 is effected through a conventional actuator 27 mounted internally of the wing 10 secured, for example, at one end to wing structure, e.g., a wing intercostal member 28 and at its opposite end to a projecting ear 29 or its equivalent carried by the aileron 14. Thus as the actuator 27 is extended, the aileron 14 is deflected upward with respect to the neutral position and as it contracts, the aileron 14 moves down with respect to the neutral position. In either case air from the duct 15 is caused to blow over the aileron surface that is opposite to the direction of such aileron movement.

Figure 4:
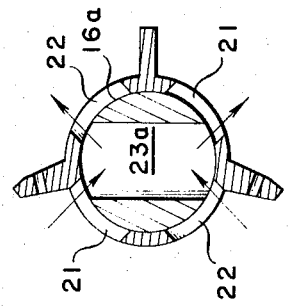
FIG. 4 is a section similar to FIG. 1 of the control valve alone to show a modified form thereof.

Referring to FIG. 4, a slightly modified control valve 16a is shown. This valve 16a differs from the valve 16 previously described in that its transverse passage 23a is appreciably wider than the passage 23 of the FIG. 1 embodiment so as to normally overlap an equal portion of each of the ports 21 and 22. Thus, unlike FIG. 1, air in the duct 15 is free to flow symmetrically through ports 21 and 22 when the aileron 14 is located in the neutral position. Upon deflection of the aileron 14 as described, however, one of the ports 21 or 22 is gradually closed while the other port 21 or 22 is gradually opened. In the extreme position of deflection one port 21 or 22 is fully closed and the other port fully opened so that the entire air discharge is through only the selected port 21 or 22.

While the control mechanism herein contemplated has been illustrated and described in what is believed to be its best embodiment at the present time, the instant invention contemplates other embodiments under given conditions. Such other embodiments and variations are contemplated as fairly fall within the scope of the appended claims.

What is claimed is:

1. A boundary layer air control mechanism for aircraft having a movable external control surface comprising:
   an air duct mounted to fixed structure of the aircraft and disposed within said movable control surface;
   at least one pair of discrete chambers within said control surface each having at least one inlet port and at least one outlet port, each outlet port of one of said chamber pairs terminating in a nozzle adjacent one side of said control surface and each outlet port of the other of said chamber pairs terminating in a nozzle adjacent the other side of said control surface;
   a valve disposed between said duct and the inlet ports of each pair of chambers aforesaid operable to establish communication between said duct and each inlet port of either one of said chambers; and
   an actuator for said valve for the operation thereof whereby air in said duct is discharged through the nozzle on one side of said surface only.

2. The control mechanism of claim 1 wherein said fixed aircraft structure is a wing and said air duct is rotatably mounted in at least one bearing carried by said wing and extends spanwise along one end thereof.

3. The control mechanism of claim 1 wherein said valve includes a passage having a transverse dimension less than the distance between the associated inlet ports so that there is no communication between said duct and either one of said chambers except when the valve is operative as aforesaid.

4. The control mechanism of claim 1 wherein said valve includes a passage having a transverse dimension greater than the distance between the associated inlet ports so as to overlap an equal portion of each at all times except when the valve is operative as aforesaid.

5. The control mechanism of claim 1 wherein said actuator includes a first connection between said valve and said movable control surface for operation of the former concurrently with movement of the latter and a second connection between said valve and said fixed structure for operation of the valve to discharge air through the nozzle on the side of said surface opposite to the direction of movement thereof.

* * * * *